June 10, 1941.    M. G. FIEDLER    2,244,874
FUEL NOZZLE FOR SOLID FUEL INJECTION ENGINES
Original Filed Nov. 12, 1937    4 Sheets-Sheet 3
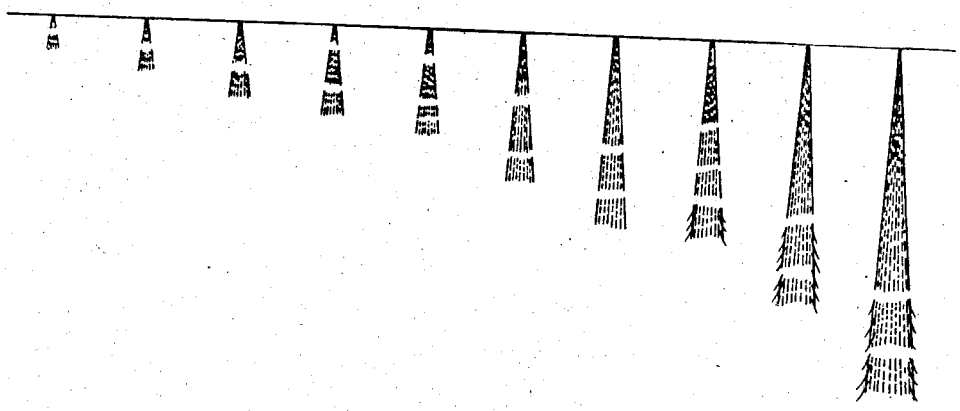
Fig. 5.
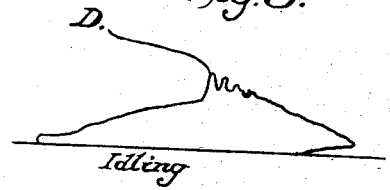
Fig. 8. Idling
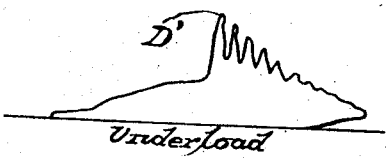
Fig. 9. Underload
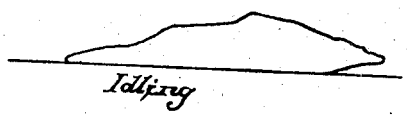
Fig. 10. Idling
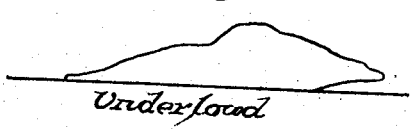
Fig. 11. Underload
Inventor:-
Max George Fiedler
by his Attorneys
Howson & Howson June 10, 1941.  M. G. FIEDLER  2,244,874
FUEL NOZZLE FOR SOLID FUEL INJECTION ENGINES
Original Filed Nov. 12, 1937  4 Sheets-Sheet 4

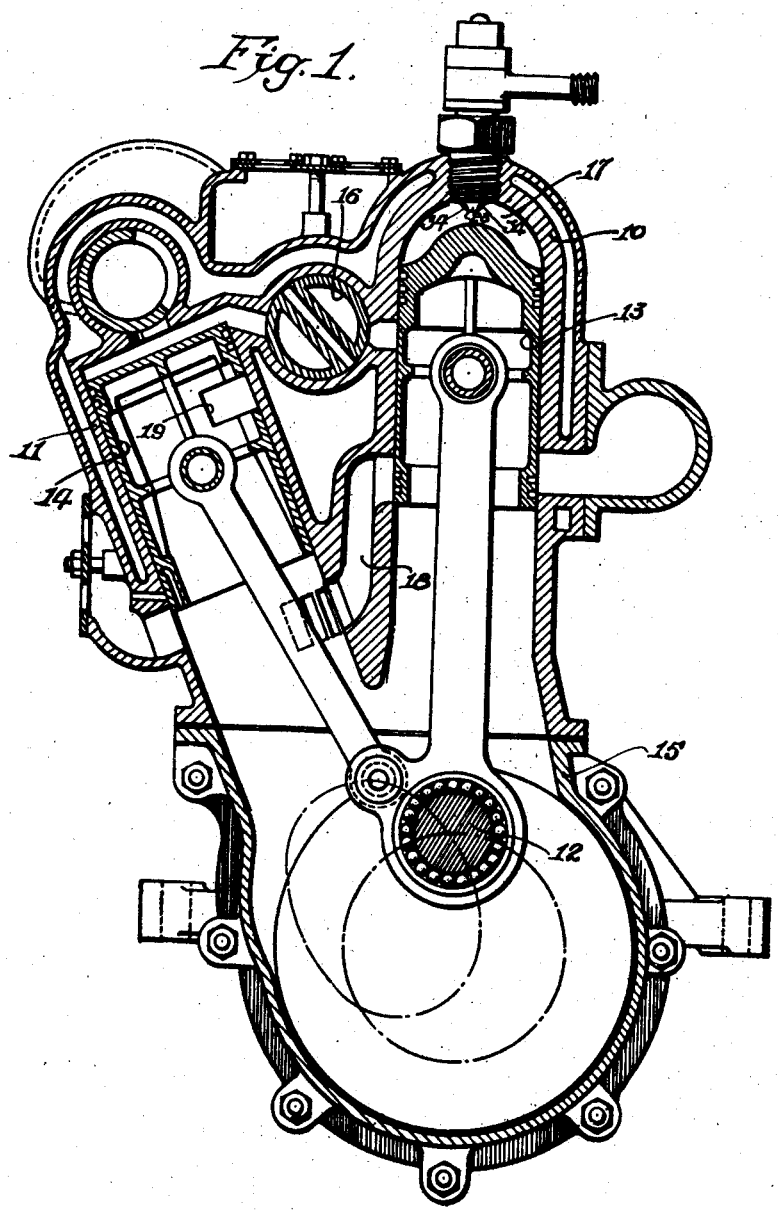

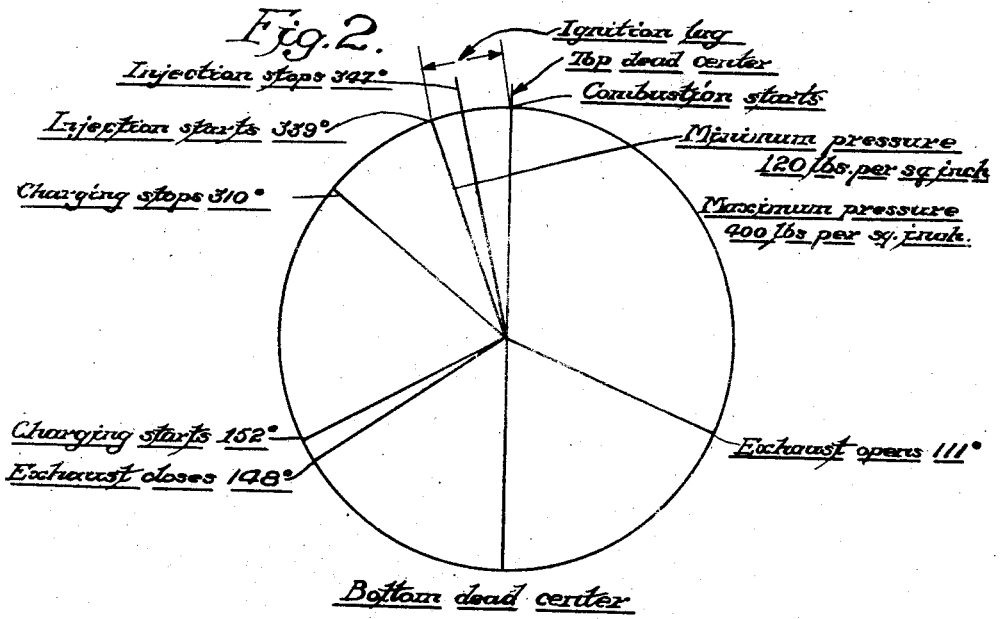
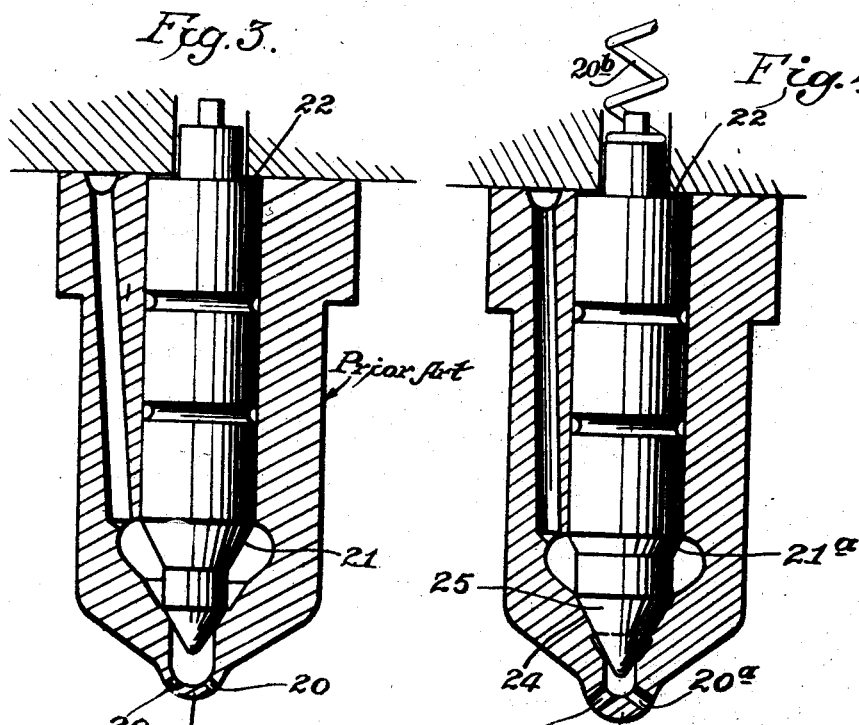

Inventor:—
Max George Fiedler
By his Attorneys
Howson & Howson

Patented June 10, 1941

2,244,874

UNITED STATES PATENT OFFICE 2,244,874

FUEL NOZZLE FOR SOLID FUEL INJECTION ENGINES

Max George Fiedler, Chester, Pa., assignor to Fiedler-Sellers Corporation, Philadelphia, Pa., a corporation of Pennsylvania Original application November 12, 1937, Serial No. 174,238. Divided and this application September 7, 1938, Serial No. 228,875

3 Claims. (Cl. 299—107.5)

This invention relates to compression ignition engines of the oil-burning type, or that type usually referred to as Diesel engines, and more particularly to a method of operating these engines in a manner such that they may operate on what is known as the Otto cycle; may be constructed and operate in the automotive speed sizes and ranges; and will operate without detonation throughout such speed ranges, and to provide a method of fueling the engine contributing principally to the attainment of the foregoing objects.

It is well known that the combustion of hydrocarbons may be either a direct oxidation or a decomposition followed by oxidation of the destruction products. In practice, there is a race between the two processes, the conditions being more favorable to hydroxylation when a fuel has been properly divided and mixed with air before it is burned, at which time the flame is blue and has no tendency to soot. The conditions are more favorable to destructive combustion when the fuel is exposed very suddenly and in a highly vaporized condition to flame temperatures, the fuel particles decomposing rapidly before they can find oxygen, and under these conditions there is a yellow radiation caused by the burning carbon and a tendency to form soot.

In the ordinary Diesel engine, air is compressed to the greatest possible extent to prevent ignition lag, and a readily ignitible oil is employed for the same reason. I have found that in high speed Diesel engines having a high compression ratio the first fuel entering the combustion space does not ignite but meets with the turbulent compressed air. Part of the entering fuel will mix with more or less turbulent air until, in some part of the chamber suitable mixture for self-ignition has been established and combustion will start. If the duration of injection is continued after combustion has occurred this fuel will meet air which is not only strongly turbulent but mixed with combustion residue. As injection continues the air becomes saturated with the products of combustion until the interference with further combustion is so serious that free carbon will be generated. In the ordinary Diesel this occurs at a point where approximately 50% of the available air has been consumed. The time necessary to establish the proper mixture for the first auto-ignition is equal to the ignition lag and influenced to a great extent by turbulence during injection, but also by the shape of the combustion chamber, the spray characteristics, duration of injection, and, to some extent, by the compression pressure. To a large extent the ignition lag in the engine is directly dependent upon the degree of turbulence, increasing with such turbulence due to the fact that the air usually rotates at high speed around the cylinder axis throwing the entering fuel into the coldest zone adjacent the cylinder wall. This can only be counteracted through high compression and it follows that previous engines having high turbulence must work under very high compression pressures, often as high as 40 to 50 atmospheres, and even under these circumstances detonation frequently results.

Analyzing the standard spray characteristics as produced today in the usual solid fuel injection engines, it is found that the fuel, through being subjected to high injection pressures (3,000 to 20,000 lbs.) and through being forced through very small orifices is substantially in a vapor stage. In addition to that, as has been photographically demonstrated, the spray itself is very compact and cannot be broken up even by the most violent turbulence. This spray is, therefore, exposed to high compression temperatures without the ability to mix with air and the result is, inevitably, cracking. The combustion will, therefore, follow the second type mentioned above and since part of the combustion will be a hydrogen-oxygen or oxygen-methane reaction at the high temperatures and pressures existing in Diesel engines, will, undoubtedly, be extremely violent and destructive. Furthermore, since the injection is through such fine orifices, the injection period necessarily, and of course purposely under the Diesel system, continues after combustion has actually begun and, obviously, the later injected fuel will crack producing further hydrogen-oxygen reactions.

I have discovered that proper operation may be provided by observing the following precepts:

1. In small bore, short stroke engines the use of a relatively large combustion space and the maintenance of the air in this space in a high state of turbulence in order that the mixture may be as complete and rapid as possible.

2. The instantaneous, or substantially instantaneous injection of the fuel into the combustion chamber, and the use of low compression pressures (approximately 240 pounds at the time of starting injection) thereby causing a combustion lag, in order that all of the fuel may be delivered thereto before combustion begins.

3. The introduction of the fuel spray into the combustion chamber in a form in which it is loosely bonded and under relatively low injection pressures (preferably less than 1200 lbs.) thereby enabling the fuel to readily combine with the air in the combustion chamber and establish an auto-ignition mixture as rapidly as possible.

The method of operating the engine per se is claimed in my prior application Serial No. 134,427, filed April 1, 1937, for "Engine and method of fueling the same." The method of introducing fuel to the combustion chambers is claimed in my copending application Serial No. 174,238, filed November 12, 1937, for "Fuel nozzle for solid fuel injection engines and method of operating the same," of which this application is a division, and the fuel nozzle per se forms the subject matter of the present application.

These conditions may be satisfied by use of the methods hereinafter described and the apparatus disclosed in the accompanying drawings wherein:

Fig. 1 is a sectional view through an engine suitable for operation in accordance with my invention;

Fig. 2 is a cycle diagram of the engine operation;

Fig. 3 is a conventional injection nozzle of the type at present in use;

Fig. 4 is a sectional view through a nozzle modified for use in accordance with my invention;

Fig. 5 is a diagrammatic view illustrating the type of spray produced by the nozzle of Fig. 4;

Figure 6:
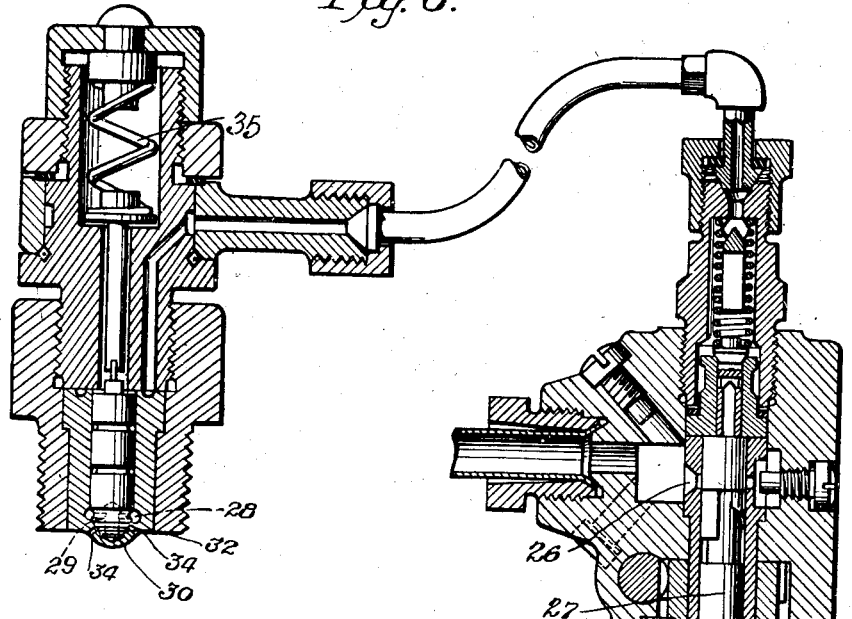
Fig. 6 is a sectional view showing a preferred type of nozzle and the pump connection thereto.
Figure 7:
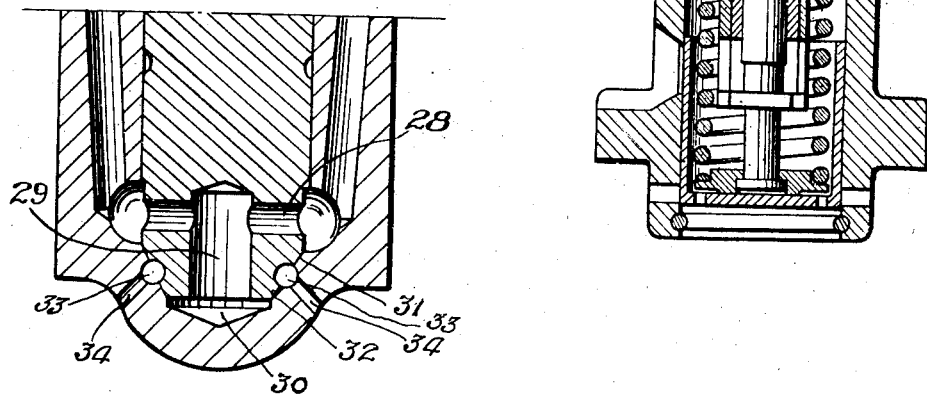
Fig. 7 is a highly enlarged sectional view through a portion of the nozzle of Fig. 6.

Figs. 8 and 9 are card diagrams showing operation of the engine with the ordinary type of injection; and Figs. 10 and 11 are card diagrams taken under identical conditions with those in Figs. 8 and 9, but with use of the new type of injection and operation.

In attaining the first of these precepts it is possible, and preferable, to employ, particularly where small-bore, short-stroke engines are being utilized, a structure such as shown in Fig. 1 comprising, briefly, a working cylinder 10, a supercharging cylinder 11, a common crank shaft 12 controlling the operation of the pistons 13 and 14 of these cylinders, and a common crank case 15 for the cylinders. Communication between the upper ends of the cylinders is through a valve 16, disclosed as of the rotary type, preferably so arranged that the valve itself acts as a storage reservoir for the final compression of the supercharging cylinder and subsequently delivers the stored pressure to the working cylinder at the beginning of the compression stroke thereof. As shown in the drawings, the compression space 17 is relatively large as compared with that of the usual compression ignition type engine, and the supercharging cylinder is of such size that compression ignition pressures may be provided in this chamber but of a comparatively low order. Scavenging of the working cylinder is attained by injecting air compressed in the crank case 15 by the simultaneous downward movement of the pistons 13 and 14, there being a port 18 which, when the piston 14 is in its lowermost position, places in communication, through an opening 19 in the piston of the supercharging cylinder, the interior of the crank case and the interior of cylinder 10. Relatively highly compressed air provided through compression by both pistons swirls violently in the cylinder 10, setting up a high degree of turbulence which is maintained until the working piston has again passed through its compression stroke with the supercharging and the charge has been admitted as hereinafter described. Thus, while a large volume of air is retained in the cylinder, a charge completely sufficient to the needs of the injected fuel, this charge is maintained in a highly turbulent state, insuring a substantially instantaneous complete mixture of the air with the injected fuel.

The second precept may, obviously, be obtained in a variety of fashions as, for example, by multiplying the number of nozzles employed and thereby increasing the effective injection area so that the period necessary to injection of a predetermined amount of fuel may be reduced to the desired point. I have found that the injection period should not exceed 10° of crank travel, and preferably should be confined to approximately 7° thereof. Since the engine is now to operate as a constant volume engine, all of the fuel being injected before ignition, it is, of course, desirable that this fuel be entered prior to the arrival of the working piston 13 at top dead center, the arrangement being preferably that illustrated in the cycle diagram forming Fig. 2, in which the injection is illustrated as occurring in advance of the top dead center, a distance corresponding to the average combustion lag. While the injection period might be delayed beyond the point illustrated, this will, obviously, result in a loss of efficiency, the operation of the engine under such circumstances being substantially that of gasoline engines operating with a retarded spark. The compression pressure of the engine must be kept sufficiently low to insure a combustion lag enabling complete injection of the charge prior to initial combustion, and must be sufficiently rapid to insure against vapor formation. It will be noted that this is directly contrary to Diesel practice in which the production of highly vaporized sprays is sought and in which the compression pressures are carried to the highest possible point in order to avoid ignition lag. My invention, as so far described, is disclosed in my prior United States application for patent, Serial No. 34,134, filed July 31, 1935, entitled "Engine."

Such an arrangement as that already suggested will result in a highly improved operation of the engine, but to insure complete elimination of detonation, a smooth operation of the engine over a wide speed range, and an economical fuel injection system, the construction should be restricted to a single injection nozzle of peculiar characteristics. As is well known to those familiar with Diesel construction as hitherto practiced, the usual nozzle comprises a valve lifted up by the injection pressure and thus permitting the escape of the fuel to the cylinder through orifices 20 (see Fig. 3). Due to the relatively large area of the lifting surface 21 provided on such valves, with the attainment of injection pressure, the valve is violently thrown upwardly against a stop 22 and there remains throughout the injection period, the restricted orifices providing sufficient back pressure to maintain it in this position.

I have found that by materially reducing the lifting area of this valve, as at 21a in Fig. 4, and increasing the diameter of the discharge openings 20a to an extent such that the pressure beneath the valve is constantly relieved and at the same time providing the valve with a relatively heavy spring 20b of high frequency, the valve will chatter against the seat or rather upon the fluid passing over this seat, reducing the fuel to a foam which is discharged through the openings 20a at a much reduced pressure and in relatively large particles. The increase of the size of the openings 20a requires a thickening of the wall 23 through which these openings are formed in order that they may properly guide the fuel and insure correct distribution thereof. The fuel then has a spray characteristic typified in Fig. 5, and is in the form of loose particles which may be readily taken up and surrounded by the air in the combustion chamber, with the result that a thorough commingling is obtained, insuring proper proportioning of air to fuel at the time the mixture attains the flash point. As indicated above, the openings should be much larger than those ordinarily employed, and in an injector found to give excellent results 6 openings were employed of a diameter of .9 millimeter as compared to 6 openings having .3 millimeter utilized in the usual injection nozzle; in other words, an increase of approximately 900 per cent in injection area.

In general, it may be stated that the area of the openings must exceed the maximum area afforded by the valve seat 24 and the valve 25 during the injection period. It will be obvious that the valve, during the injection period, acts not only as a valve but likewise as a flexible orifice, through which the fuel may enter, exercising upon the fuel because of its flexibility an agitating action producing a relatively loose foam. The valve seat itself should be of relatively large diameter in order to obtain large impact relief areas with a minimum lift and the valve spring should be strong enough so that at minimum pressure it will counteract the inertia effect of the valve stem under impact and continually attempt to reseat the valve and thus produce the chattering action on the fuel passing over the seat. To this end, as previously stated, a heavy valve spring having a high frequency is preferable.

While the injection nozzle of Fig. 4 provides a highly improved operation, it was found in practice that this nozzle, after heating to approximately 700° caused detonation. It was finally determined that the foam formed in advance of the nozzle tip by the chattering of the valve upon its seat tended to vaporize at the nozzle tip with resulting detonation in operation. For this reason, the valve of Fig. 6 was developed. In this valve the lifting area is transferred to the center of the valve, ports 28 communicating with a passage 29 opening through the bottom of the valve and into a chamber 30 at the nozzle tip. The valve seat is divided into two sections 31 and 32 by a groove 33 aligned with the discharge ports 34. By this construction all foaming fuel is discharged from the valve and the tip of the nozzle is kept cool by maintenance of a solid body of the fuel thereagainst. This valve, as in the case of the valve of Figure 4, is maintained seated by a heavy high-frequency spring 35.

Tests with an injection nozzle of this type have proven conclusively not only its value in improving the explosion characteristics of the engine but likewise that for maximum efficiency certain definite characteristics and proportions should be employed in the injection system exterior to the nozzle. I have found, for example, that the injection at the nozzle is responsive not so much to the injection to the system by a measuring pump of a predetermined amount of fluid as to the impact resulting on the fluid line from the initial opening of the fuel line to receive the fuel displaced by the pump. This is evidenced by the fact that the injection period does not appreciably vary through a considerable range of injection as regards the amount of fuel which passes through the nozzle. With the same nozzle it is possible to inject 10 to 100 cubic millimeters of fuel to the cylinder in the same interval. This is apparently due to the fact that with a greater fuel injection a greater residual pressure exists in the line connecting the pump and nozzle and, accordingly, the impact blow resulting on initial injection is transmitted with greater force to the valve. The injection apparently immediately follows the closing of the intake openings 26 of the pump by the piston 27 thereof. The speed of operation of the pump piston apparently has little effect on the injection although it is found that a greater fuel injection can be obtained through use of a relatively slow operation of the piston. In actual use, sharp, medium and eccentric cams have been utilized, and it is found that the eccentric cam gives much the best results, the sharp cam tending to upset equilibrium of the system. The indications are, accordingly, to the use of a large diameter pump operated by an eccentric cam through a short plunger travel.

I have, further, found that there are definite characteristics necessary to the discharge line connecting the pump and nozzle if proper injection characteristics are to be obtained. For example, a discharge nozzle having openings of the size above mentioned employed in an engine of the character described must have a discharge line of definite length; in the construction under test, .533 meter. It is found that a shorter line causes double injection; that is to say, there are two definitely separated injection periods for each operation of the pump, apparently caused by the fact that the shorter line does not provide the dampening effect necessary and the impact blow becomes too great for the system. On the other hand, a longer line causes double injection, for the apparent reason that there is too great a volume of liquid in the system causing a lag. It might appear that the presence of too much fluid in the system occasioned by the use of a long line might be overcome by a reduction of the diameter of the discharge line, but this is not the case, for it is found that unless the diameter of the line is kept quite large the impact blow creates such high speed in the column that it cannot be controlled by the valve or flexible orifice. As a matter of fact, I have found that a relatively large line as compared to the standard line of 0 to 2 millimeters in diameter is essential and in practice employ a line at least 3, and preferably 4 millimeters in diameter. In any case, the line must be large enough to prevent too great an impact and, in general, the larger the amount of fluid to be injected, the larger the line should be. It has also been found that the amount of fuel injected through a given period can be varied within given limits by variation of the size of the pump employed. For example, a pump having a piston 10 millimeters in diameter provides an injection range between 10 and 100 cubic millimeters, while with the same line and conditions a pump having a piston of 13 millimeters in diameter provides an injection range of between 10 and 160 cubic millimeters in the same injection period.

I have determined that the temperature range at which injection should take place in order to permit the proper ignition lag enabling all of the fuel to be injected before combustion starts is provided by a compression pressure having a minimum of 120 pounds per square inch and a maximum of 400 pounds per square inch, the most efficient range being between 330 pounds and 360 pounds to the square inch. In this range the temperatures are sufficiently high to cause rapid heating of the material and are at the same time below the decomposition temperature when the fuel is delivered to the cylinder in the form of a coarse spray.

The vast improvement in operation of an engine in fuel injection under the above-outlined circumstances as against the normal injection methods may be visualized by comparing the indicator cards forming Figs. 8 to 11. The indicator cards of Figs. 8 and 9 are cards taken from an engine utilizing the ordinary nozzle and developing a perfect highly atomized compact spray in accordance with the principles of present-day Diesel practice.

It will be noted that a succession of detonation peaks D appear even when the engine is idling, as in Fig. 8. These peaks are much exaggerated when the engine is operating under load, as indicated at D' in Fig. 9. On the contrary, when the type of injection just described is employed in the same engine and under the same conditions, these peaks immediately disappear and when idling or under load the engine shows no tendency to the detonations responsible for these peaks. (See Figs. 10 and 11.)

Through the use of this method of fueling the engine and the nozzle construction hereinbefore described, I am able to produce an engine which is particularly adapted for use in automotive fields. In an engine from which the indicator cards forming Figs. 10 and 11 were taken when using the new fueling system, such engine having 4 cylinders and a bore and stroke of $3\frac{5}{32}''$ and $4''$ respectively excluding the exhaust port area, when operating at 1800 revolutions produced 150 H. P., and at 1,000 revolutions produced 80 H. P. It is, however, operable in the higher automotive ranges; that is to say, 3,000 to 4,000 revolutions.

It will be noted that an engine operated as above described operates neither on the Diesel nor the Otto cycle, differing from the former in that the fuel injection occurs through an extremely short period and entirely prior to combustion; that the injection employed is a spray of loose particles rather than a highly vaporized injection; that an ignition lag is deliberately sought for, to enable the injection to be made prior to combustion, and that volumetric capacity of the engine is greatly increased from the ordinary Diesel, with the result that much higher engine speed can be obtained. It differs from the Otto cycle both in the fact that the volume of air introduced is materially increased, and that the fuel is separately injected.

Since both the method illustrated and the construction described are capable of considerable modification without departing from the spirit of the invention, I do not wish to be understood as limiting myself thereto except as hereinafter claimed.

I claim:

1. In fuel injection apparatus of the type described, a body having large discharge openings, seating means over which liquid fuel must pass to reach said openings, a valve coacting with the seating means, means to periodically deliver fuel to the body in a manner tending to unseat the valve, and a spring tending to seat the valve, said discharge openings being of such size, and the lifting area of the valve subjected to the fuel pressure and said spring being so proportioned and arranged that, at the selected injection pressure of the fuel, the fuel pressure is released immediately upon unseating of the valve whereby the valve is caused to chatter on the fuel during the delivery period.

2. In fuel injection apparatus for engines, a body having large discharge openings, seating means over which liquid fuel must pass to reach said openings, a valve coacting with the seating means and having a reduced pressure area, means to periodically deliver fuel to the body against said pressure area to unseat the valve, and a spring tending to seat the valve, said discharge openings being of such size, and the area of the valve subjected to the fuel pressure and said spring being so proportioned and arranged that, at the selected injection pressure of the fuel, the fuel pressure is released immediately upon unseating of the valve whereby the valve is caused to chatter on the fuel during the delivery period and the fuel is injected as a loose foamy mass of liquid particles.

3. In fuel injection apparatus for internal combustion engines, a body having large discharge openings, seating means over which liquid fuel must pass to reach said openings, a spring seated valve coacting with the seating means and having a reduced pressure area, means to periodically deliver fuel to the body against said pressure area in a manner tending to unseat the valve against the action of said spring, said discharge openings being of such size, and the lifting area of the valve subjected to the fuel pressure and said spring being so proportioned and arranged that at the injection pressures of the fuel of the order of not more than 1500 pounds to the square inch the fuel pressure is released immediately upon unseating of the valve whereby the value is caused to chatter on the fuel during the delivery period.

MAX GEORGE FIEDLER.